US 11,342,805 B2

(12) United States Patent
Ogawa et al.

(10) Patent No.: US 11,342,805 B2
(45) Date of Patent: May 24, 2022

(54) STATOR, MOTOR, AND ELECTRIC POWER STEERING DEVICE

(71) Applicant: Nidec Corporation, Kyoto (JP)

(72) Inventors: Hiroshi Ogawa, Kyoto (JP); Yoshinobu Arao, Kyoto (JP); Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 260 days.

(21) Appl. No.: 16/490,625

(22) PCT Filed: Nov. 22, 2017

(86) PCT No.: PCT/JP2017/042089
§ 371 (c)(1),
(2) Date: Sep. 3, 2019

(87) PCT Pub. No.: WO2018/168090
PCT Pub. Date: Sep. 20, 2018

(65) Prior Publication Data
US 2020/0014273 A1    Jan. 9, 2020

(30) Foreign Application Priority Data
Mar. 14, 2017   (JP) .............................. JP2017-048645

(51) Int. Cl.
*H02K 3/52* (2006.01)
*H02K 1/14* (2006.01)
(Continued)

(52) U.S. Cl.
CPC ............. *H02K 3/522* (2013.01); *H02K 1/146* (2013.01); *H02K 5/1732* (2013.01); *H02K 7/083* (2013.01); *B62D 5/04* (2013.01); *H02K 2203/09* (2013.01)

(58) Field of Classification Search
CPC ...... H02K 3/522; H02K 1/146; H02K 5/1732; H02K 7/083; H02K 2203/09; H02K 3/38; H02K 3/05; B62D 5/04; B62D 5/0406
See application file for complete search history.

(56) References Cited

U.S. PATENT DOCUMENTS

2008/0157610 A1   7/2008   Watanabe et al.
2011/0234031 A1   9/2011   Kato
(Continued)

FOREIGN PATENT DOCUMENTS

| CN | 101232215 A | 7/2008 |
| CN | 102201708 A | 9/2011 |

(Continued)

OTHER PUBLICATIONS

Official Communication issued in corresponding Chinese Patent Application No. 201780071663.4, dated Jan. 11, 2021.
(Continued)

*Primary Examiner* — Burton S Mullins
*Assistant Examiner* — Riley Owen Stout
(74) *Attorney, Agent, or Firm* — Keating & Bennett

(57) ABSTRACT

A stator comprises: a stator core placed in a circular ring shape around a central axis that extends vertically, onto which coil wires are wound; a first support member placed over the stator core; and a second support member placed over the first support member, the first support member having receiving grooves for guiding the coil wires coming out of the stator core, wherein the receiving grooves are grooves that open to the top and extend in a direction along the top surface of the first support member, the second support member having through-holes that axially support the coil wires, wherein the second support member at least partially overlaps the receiving grooves of the first support member in an axial view.

40 Claims, 9 Drawing Sheets

(51) Int. Cl.
  *H02K 5/173*    (2006.01)
  *H02K 7/08*     (2006.01)
  *B62D 5/04*     (2006.01)

(56) References Cited

U.S. PATENT DOCUMENTS

| | | |
|---|---|---|
| 2012/0286593 A1 | 11/2012 | Yokogawa et al. |
| 2014/0125173 A1 | 5/2014 | Hayashi |
| 2016/0111929 A1* | 4/2016 | Kessler .................. H02K 3/522 |
| | | 310/71 |
| 2016/0336831 A1* | 11/2016 | Horizumi ............... H02K 11/33 |
| 2017/0149299 A1 | 5/2017 | Sakamoto et al. |
| 2017/0302139 A1 | 10/2017 | Sakai |
| 2018/0205281 A1 | 7/2018 | Yoshida et al. |
| 2018/0233984 A1 | 8/2018 | Ogawa et al. |
| 2019/0351934 A1* | 11/2019 | Kim ....................... H02K 3/522 |

FOREIGN PATENT DOCUMENTS

| | | |
|---|---|---|
| CN | 106160296 A | 11/2016 |
| JP | 2008-043105 A | 2/2008 |
| JP | 2009-290921 A | 12/2009 |
| JP | 2011-182512 A | 9/2011 |
| WO | 2017/026491 A1 | 2/2017 |

OTHER PUBLICATIONS

Official Communication issued in International Patent Application No. PCT/JP2017/042089, dated Feb. 6, 2018.

* cited by examiner

STATOR, MOTOR, AND ELECTRIC POWER STEERING DEVICE

CROSS REFERENCE TO RELATED APPLICATIONS

This is the U.S. national stage of PCT Application No. PCT/JP2017/042089, filed on Nov. 22, 2017, and priority under 35 U.S.C. § 119(a) and 35 U.S.C. § 365(b) is claimed from Japanese Application No. 2017-048645, filed Mar. 14, 2017; the disclosures of which are incorporated herein by reference.

FIELD OF THE INVENTION

The present disclosure relates to a stator, motor, and electric power steering device.

BACKGROUND

Conventionally, there is a known motor that has a bus bar unit with a plurality of bus bars embedded in a resin molded body.

SUMMARY

A bus bar unit with a plurality of bus bars embedded in a resin molded body, in itself, requires a large number of manufacturing processes. Moreover, in some types of motor wiring, many coil wires and the bus bars need to be welded, making the process complicated.

An example embodiment of the present disclosure provides a stator comprising: a stator core placed in a circular ring shape around a central axis that extends vertically, onto which coil wires are wound; a first support member placed over the stator core; and a second support member placed over the first support member, the first support member having receiving grooves for guiding the coil wires coming out of the stator core, wherein the receiving grooves are grooves that open to the top and extend in a direction along the top surface of the first support member, the second support member having through-holes that axially support the coil wires, wherein the second support member at least partially overlaps the receiving grooves of the first support member in an axial view.

The above and other elements, features, steps, characteristics and advantages of the present disclosure will become more apparent from the following detailed description of the example embodiments with reference to the attached drawings.

DETAILED DESCRIPTION

Hereinafter, an example embodiment of the present disclosure will be described with reference to the drawings. In the description below, the direction of extension of the central axis J is a vertical direction. However, the vertical direction in the present specification is just a name used for description, but does not limit actual positional relationships or directions. Moreover, unless specifically mentioned, a direction parallel to the central axis J is simply referred to as "axial direction", a radial direction with respect to the central axis J is simply referred to as "radial direction", and a circumferential direction with respect to the central axis J (a perimeter surrounding the central axis J) is simply referred to as "circumferential direction".

Also, in the present specification, the expression "extend axially" involves extending in exactly an axial direction and extending at less than 45 degrees from the axis. Likewise, in the present specification, the expression "extend radially" involves extending in exactly a radial direction—that is, in a direction at right angles to the axis—and extending at less than 45 degrees from the radius.

Figure 1:
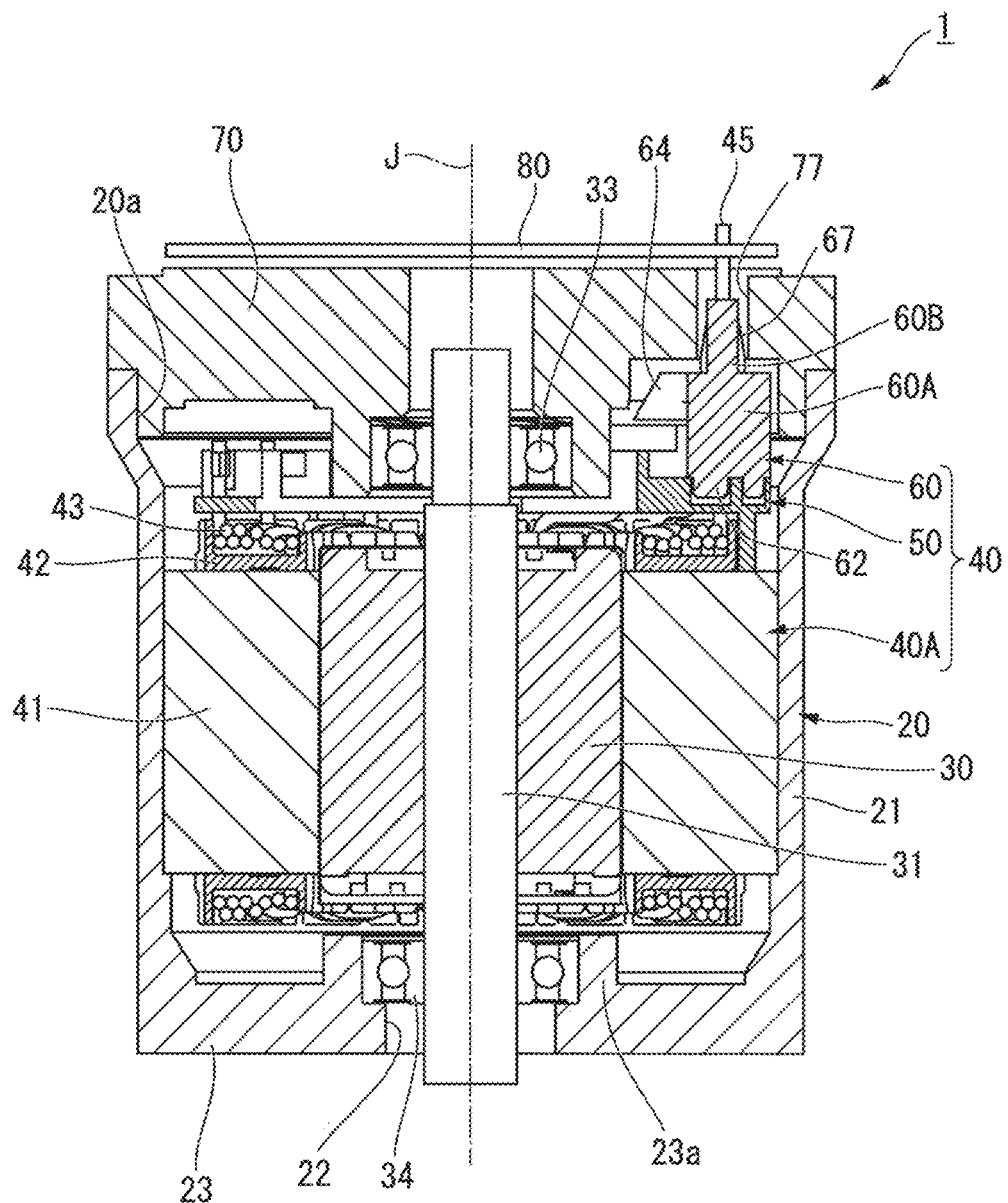
FIG. 1 is a cross-sectional view of a motor according to an example embodiment of the present disclosure.
Figure 2:
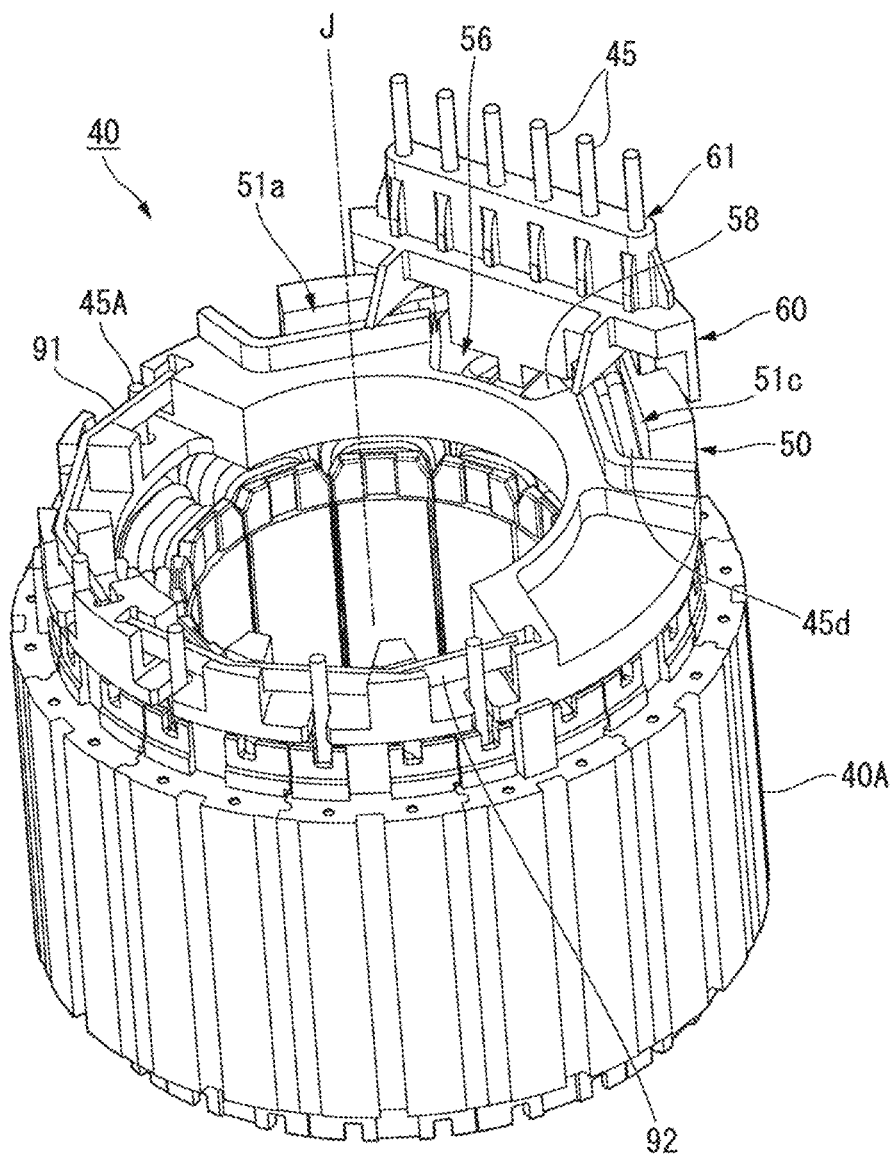
FIG. 2 is a perspective view showing main parts of a motor according to an example embodiment of the present disclosure.
Figure 3:
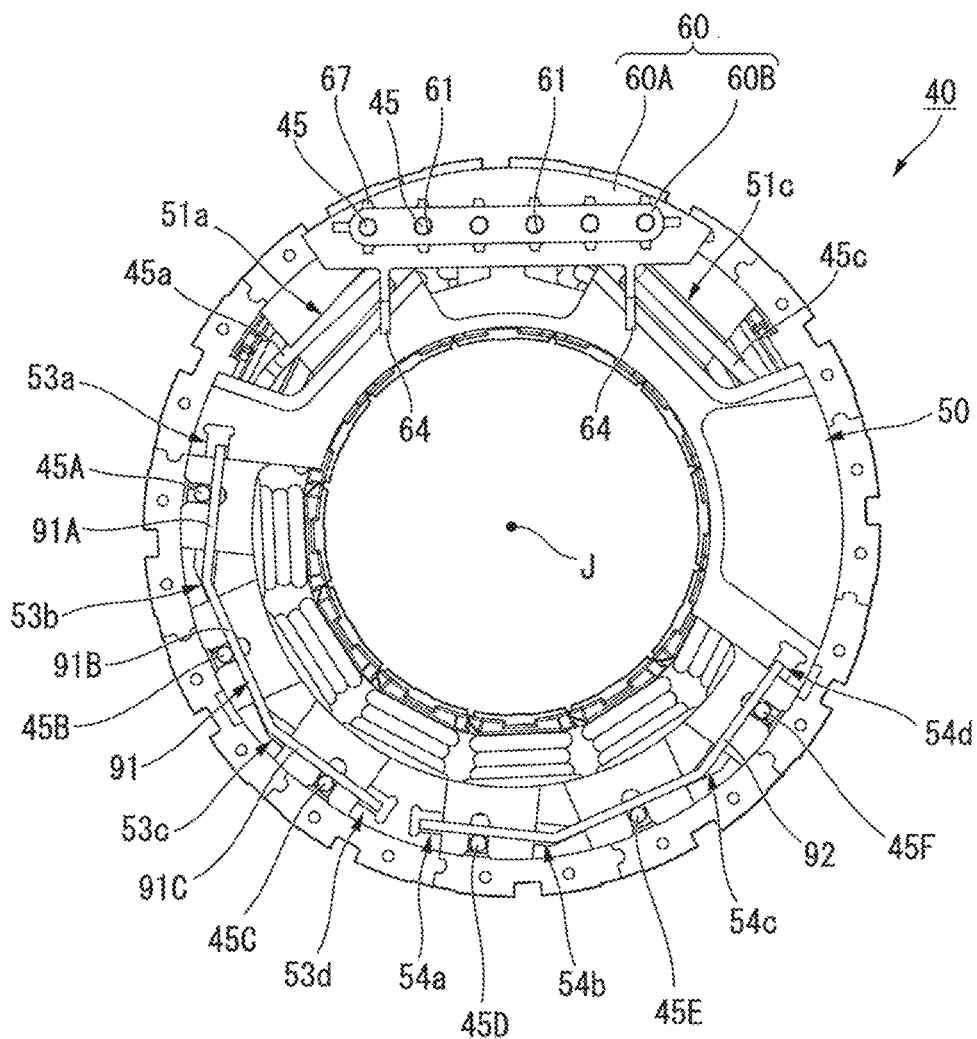
FIG. 3 is a plan view of a motor according an example embodiment of the present disclosure.

FIG. 1 is a cross-sectional view of a motor according to an example embodiment of the present disclosure. FIG. 2 is a perspective view showing main parts of a motor according to an example embodiment of the present disclosure. FIG. 3 is a plan view of a motor according an example embodiment of the present disclosure. The motor 1 comprises a housing 20, a rotor 30, a stator 40, a bearing holder 70, and a control board 80. The control board 80, bearing holder 70, and stator 40 are sequentially arranged on the motor 1 in a top-down fashion. The stator 40 has a stator body 40A comprising coils 43, and a first support member 50 and second support member 60 that support coil wires 45 coming out of the stator body 40A.

Also, in the description below, a plurality of coil wires supported on the first support member 50 and second support member 60 are simply referred to as "coil wires 45" unless any one or some of them are specified. On the one hand, a particular coil wire is indicated by a code with a subscript (a, A, etc.) written next to it, as in a "coil wire 45*a*" and a "coil wire 45A".

The housing 20 has a cylinder portion 21 that extends vertically, a bottom wall portion 23 located on the lower end of the cylinder portion 21, and an opening 20*a* that opens upward. The stator body 40A is fixed to the inner surface of the housing 20. The bearing holder 70 is inserted into the opening 20*a* of the housing 20. The control board 80 is placed on the top surface of the bearing holder 70. The control board 80 is connected to the coil wires 45 exposed from a holder pass-through portion 77 of the bearing holder 70.

The cylinder portion 21, in this example embodiment, is cylindrical around the central axis J. The cylinder portion 21 is not limited to being cylindrical, but may be in the shape of a polygonal cylinder. The bottom wall portion 23 has a bearing holding portion 23*a* placed below the stator 40 and supporting a lower bearing 34, and an output shaft hole 22 axially penetrating the bottom wall portion 23.

The rotor 30 has a shaft 31. The shaft 31 is centered on the central axis J which extends vertically. The rotor 30 rotates about the central axis J along with the shaft 31. The lower end of the shaft 31 protrudes downward from the housing 20 through the output shaft hole 22.

An upper bearing 33 and the lower bearing 34 rotatably support the shaft 31 around the central axis. The lower bearing 34 is held by the bearing holding portion 23a, on the lower side of the stator 40. The upper bearing 33 is held by the bearing holder 70, on the upper side of the stator 40.

The stator body 40A is located on the radial outer side of the rotor 30. The stator body 40A has a stator core 41, an insulator 42, and coils 43. The insulator 42 is attached to teeth of the stator core 41. The coils 43 are formed by coil wires wound on the insulator 42 and placed on the teeth of the stator core 41. The outer periphery of the stator 40 is fixed to the inner periphery of the housing 20.

The first support member 50 is a resin member and placed on the top surface of the stator body 40A. As shown in FIGS. 2 and 3, the first support member 50 is in the shape of a circular ring in an axial view. The second support member 60, which is made of resin, and neutral bus bars 91 and 92 made of metal are placed on the top side of the first support member 50.

Figure 4:
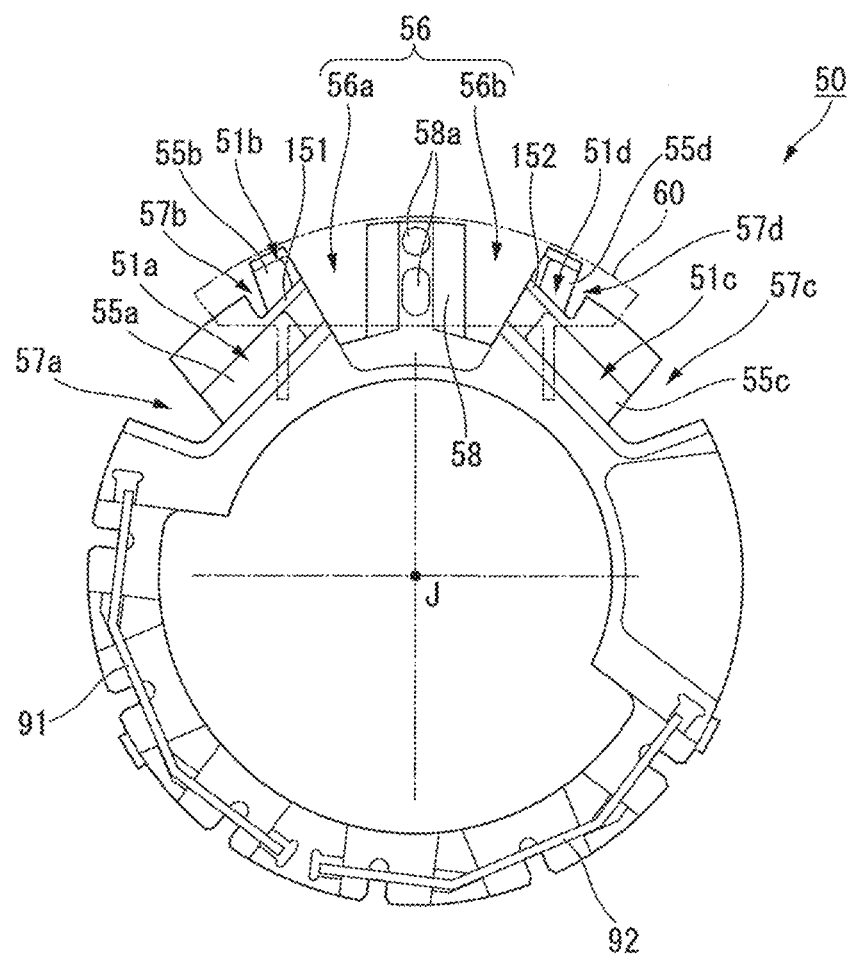
FIG. 4 is a plan view of a first support member according to an example embodiment of the present disclosure.
Figure 5:
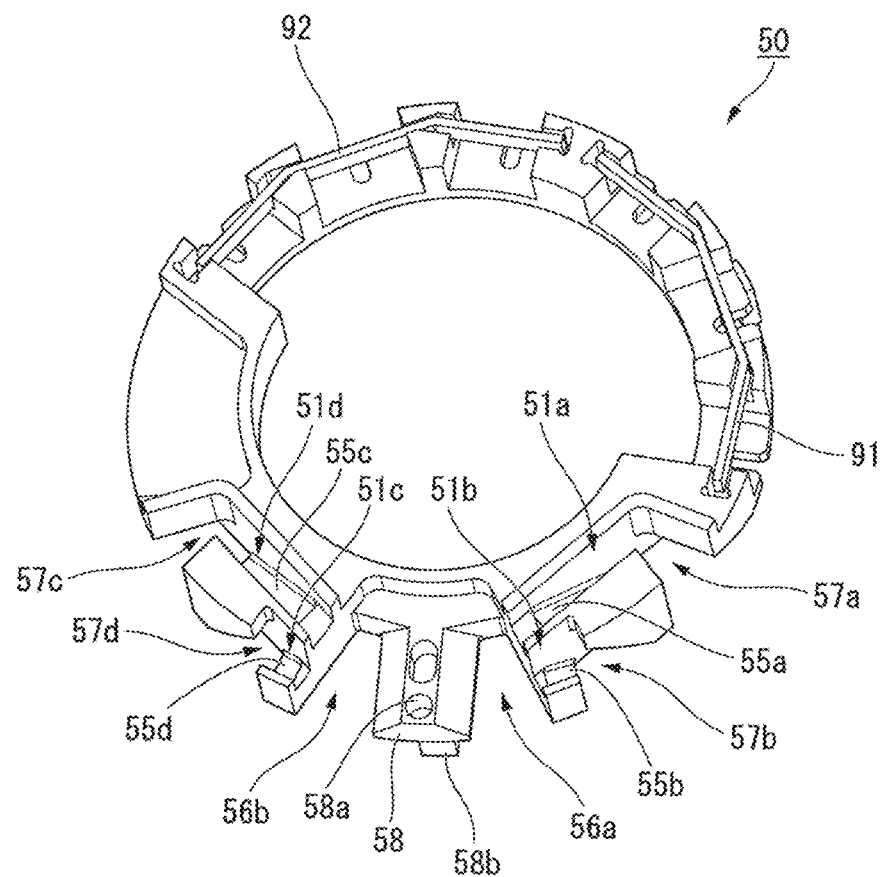
FIG. 5 is a perspective view of the first support member as viewed from above.
Figure 6:
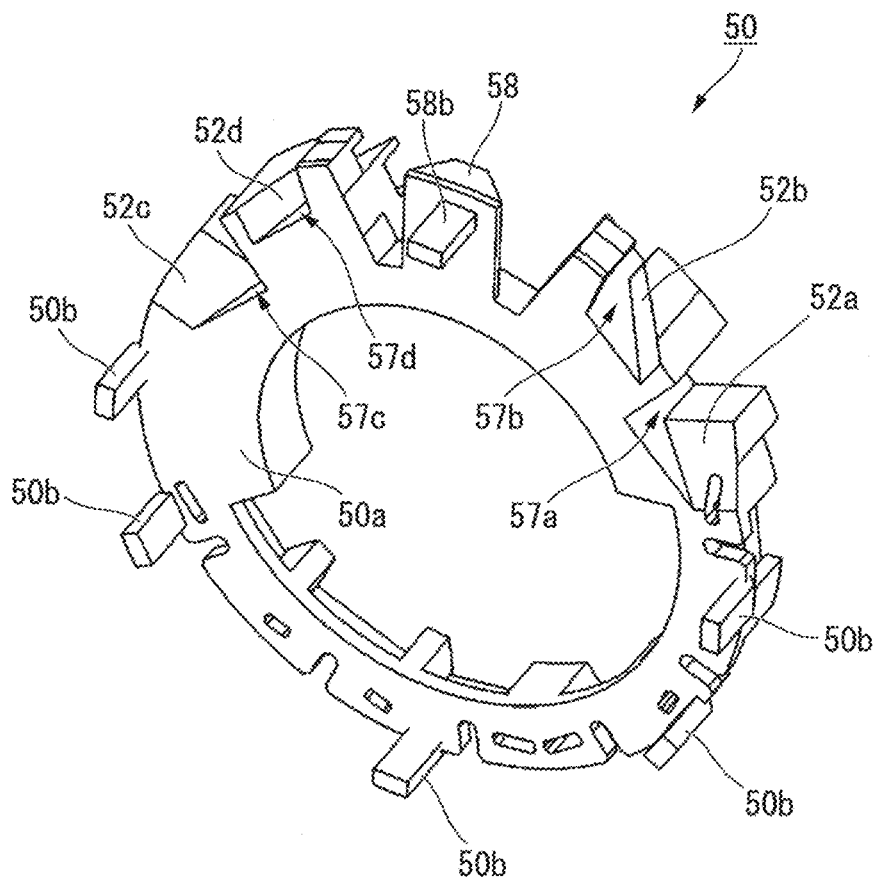
FIG. 6 is a perspective view of the first support member as viewed from below.

FIG. 4 is a plan view of the first support member. FIG. 5 is a perspective view of the first support member as viewed from above. FIG. 6 is a perspective view of the first support member as viewed from below.

The first support member 50 has a pass-through portion 56 where it overlaps the second support member 60, that vertically penetrates the first support member 50. In this example embodiment, the pass-through portion 56 is a notch that opens radially outward. The pass-through portion 56 may be a through-hole that vertically penetrates the first support member 50.

The pass-through portion 56 is divided into a first pass-through portion 56a and a second pass-through portion 56b by a plate-shaped dividing wall 58 that extends radially. The first pass-through portion 56a and the second pass-through portion 56b both vertically penetrate the first support member 50. The dividing wall 58 has a trapezoidal profile in a radial view. Two connecting recesses 58a in which part of the second support member 60 is inserted are formed on the upper surface of the dividing wall 58. The connecting recess 58a on the radial inner side is an elliptical recess that extends radially, which is used for positioning. The connecting recess 58a on the radial outer side is a round hole used for fixing. A leg portion 58b is installed on the underside of the dividing wall 58, which hits the top surface of the stator core 41. The first support member 50 is fixed to the stator core 41.

The first support member 50 has four receiving grooves 51a, 51b, 51c, and 51d. The receiving grooves 51a to 51d are grooves that open to the top of the first support member 50. The receiving grooves 51a to 51d extend in a direction along the top surface (along a plane perpendicular to the central axis J). The receiving grooves 51a to 51d have a width and depth that can accommodate the coil wires 45 (see FIG. 2) coming out of the coils 43.

The four receiving grooves 51a to 51d are arranged two by two—that is, two on either side of the pass-through portion 56 in an axial view. Two 51a and 51b of the receiving grooves 51a to 51d are located next to the first pass-through portion 56a of the pass-through portion 56. The other two receiving grooves 51c and 51d are located next to the second pass-through portion 56b of the pass-through portion 56.

The two receiving grooves 51a and 51b connect to the first pass-through portion 56a in a circumferential direction, on the edge of the pass-through portion 56. The receiving grooves 51a and 51b open on the inner surface of the first pass-through portion 56a. The receiving grooves 51a and 51b extend linearly from the first pass-through portion 56a toward the side of the pass-through portion 56. The linear shape of the receiving grooves 51a and 51b allows the coil wires 45 coming out of the coils 43 to be easily received in the receiving grooves 51a and 51b. As such, the assembly workability of the stator 40 can be improved. Also, the receiving grooves 51a and 51b may take on various shapes if the coil wires 45 are arranged along a straight line. For example, the receiving grooves 51a and 51b may be tapered at the front end if the axis along which they extend is linear.

The receiving grooves 51a and 51b are radially arranged in an axial view. The receiving groove 51a located radially inward from the receiving groove 51b is longer than the receiving groove 51b. Since the first support member 50 is in the shape of a circular ring, the longer one 51a between the linear receiving grooves 51a and 51b is placed on the radial inner side so as to decrease the area occupied by the receiving grooves 51a and 51b in the first support member 50. A wall portion 151 is provided between the receiving grooves 51a and 51b which are adjacent in the radial direction. The wall portion 151 keeps the coil wires received in the receiving grooves 51a and 51b from making contact with each other.

The bottom surface of the receiving groove 51a comprises an upward sloping surface 55a which is inclined with respect to the central axis J. The bottom surface of the receiving groove 51b comprises an upward sloping surface 55b which is inclined with respect to the central axis. J. The upward sloping surfaces 55a and 55b both are sloping surfaces whose axial position gets higher toward the first pass-through portion 56a. With this configuration, the coil wires 45 may be pulled out obliquely along the upward sloping surfaces 55a and 55b. As such, the coil wires 45 may be pulled out to the pass-through portion 56 where the second support member 60 is placed, without being bent at a right angle.

In this example embodiment, as shown in FIG. 5, the upward sloping surface 55a is positioned higher than the upward sloping surface 55b, in an area where the upward sloping surface 55a and the upward sloping surface 55b overlap on the circumference as viewed from outside the radius. The upward sloping surface 55a and the upward sloping surface 55b are inclined at the same angle with respect to the central axis J, and the upper end of the upward sloping surface 55a is positioned higher than the upper end of the upward sloping surface 55b. Since the receiving grooves 51a and 51b are located at different axial positions at the bottom, the coil wires 45 received in the receiving grooves 51a and 51b are kept from making contact with each other.

The end of the receiving groove 51a opposite the pass-through portion 56 connects to a guide portion 57a that extends upward from the underside of the first support member 50. The end of the receiving groove 51b opposite the pass-through portion 56 connects to a guide portion 57b that extends upward from the underside of the first support member 50. In this example embodiment, the guide portions 57a and 57b are notched portions that open radially outward and upward from the first support member 50. The first guide portions 57a and 57b may be notches that open radially inward, or may be holes that open to the underside of the first support member 50 and connect to the corresponding receiving grooves 51*a* and 51*b*.

As shown in FIG. 6, the first support member 50 has a downward sloping surface 52*a* that faces downward (toward the stator body 40A) and is inclined with respect to the central axis J, which is a surface on the guide portion 57*a* that guides the coil wires 45. The first support member 50 has a downward sloping surface 52*b* that faces downward (toward the stator body 40A) and is inclined with respect to the central axis J, which is a surface on the guide portion 57*b* that guides the coil wires 45. As the coil wires 45 coming out of the coils 43 make contact with the downward sloping surfaces 52*a* and 52*b*, the coil wires 45 are easily directed to the receiving grooves 51*a* and 51*b*. This allows the coil wires 45 to be pulled out easily.

The other two receiving grooves 51*c* and 51*d* have the same configuration as the receiving grooves 51*a* and 51*b* and achieve the same functional effects. The configuration of the receiving grooves 51*c* and 51*d* only will be described below. The receiving grooves 51*c* and 51*d* open to the inside of the second pass-through portion 56*b* on the edge of the pass-through portion 56. The receiving grooves 51*c* and 51*d* extend linearly from the second pass-through portion 56*b* toward the side of the pass-through portion 56. The receiving grooves 51*c* and 51*d* are radially arranged in an axial view. The receiving groove 51*c* located radially inward from the receiving groove 51*d* is longer than the receiving groove 51*d*. A wall portion 152 is provided between the receiving grooves 51*c* and 51*d* which are adjacent in the radial direction.

The bottom surface of the receiving groove 51*c* comprises an upward sloping surface 55*c* which is inclined with respect to the central axis J. The bottom surface of the receiving groove 51*d* comprises an upward sloping surface 55*d* which is inclined with respect to the central axis. J. The upward sloping surfaces 55*c* and 55*d* both are sloping surfaces whose axial positions get higher toward the second pass-through portion 56*b*.

The end of the receiving groove 51*c* opposite the pass-through portion 56 connects to a guide portion 57*c* that extends upward from the underside of the first support member 50. The end of the receiving groove 51*d* opposite the pass-through portion 56 connects to a guide portion 57*d* that extends upward from the underside of the first support member 50. In this example embodiment, the upward sloping surface 55*c* is positioned higher than the upward sloping surface 55*d*, in an area where the upward sloping surface 55*c* and the upward sloping surface 55*d* overlap on the circumference as viewed on the radial outer side. The upward sloping surface 55*c* and the upward sloping surface 55*d* are inclined at the same angle with respect to the central axis J, and the upper end of the upward sloping surface 55*c* is positioned higher than the upper end of the upward sloping surface 55*d*.

As shown in FIG. 6, the first support member 50 has a downward sloping surface 52*c* that faces downward (toward the stator body 40A) and is inclined with respect to the central axis J, which is a surface on the guide portion 57*c* that guides the coil wires 45. The first support member 50 has a downward sloping surface 52*d* that faces downward (toward the stator body 40A) and is inclined with respect to the central axis J, which is a surface on the guide portion 57*d* that guides the coil wires 45.

Figure 7:
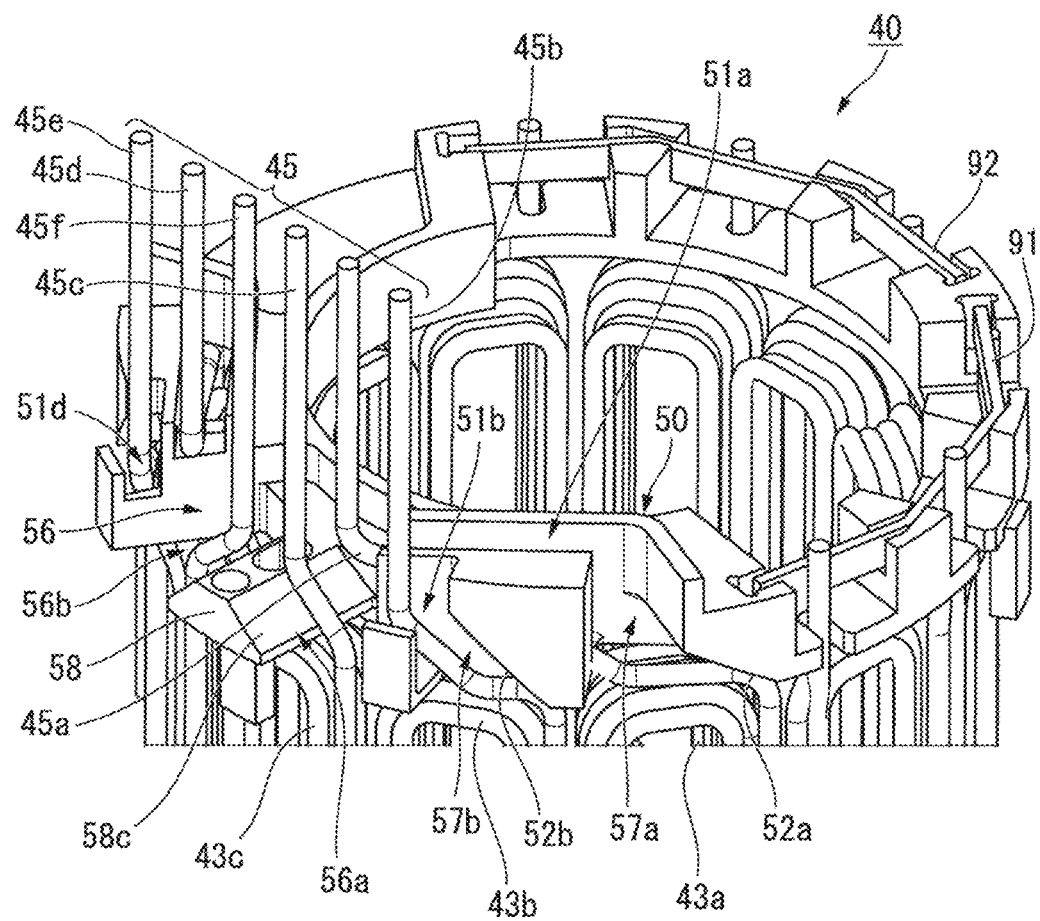
FIG. 7 is a partial perspective view showing an example of how coil wires are pulled out of the first support member.

FIG. 7 is a partial perspective view of a stator showing an example of how the coil wires 45 are pulled out of the first support member 50. The receiving grooves 51*a* and 51*b* of the first support member 50 are arranged in such a manner that the coil wires 45 coming out of the coils 43 of the stator body 40A move along the top side of the first support member 50, and guide them to the second support member 60.

The receiving groove 51*a* guides the coil wire 45*a* extending from the coil 43*a* located under the guide portion 57*a* to the first pass-through portion 56*a*. The coil wire 45*a* extending upward from the coil 43*a* is bent toward the receiving groove 51*a* along the downward sloping surface 52*a* of the guide portion 57*a* and inserted into the receiving groove 51*a*. The coil wire 45*a* extends obliquely upward in a linear shape inside the receiving groove 51*a* and reaches the first pass-through portion 56*a*. The coil wire 45*a* is bent upward within the first pass-through portion 56*a* and held while extended above the pass-through portion 56.

The receiving groove 51*b* guides the coil wire 45*b* extending from the coil 43*b* located under the guide portion 57*b* to the second pass-through portion 56*b*. The coil wire 45*b* extending upward from the coil 43*b* is bent toward the receiving groove 51*b* along the downward sloping surface 52*b* of the guide portion 57*b* and inserted into the receiving groove 51*b*. The coil wire 45*b* extends obliquely upward in a linear shape inside the receiving groove 51*b*, and is bent upward within the receiving groove 51*b* and held while extended above the receiving groove 51*b*. Although the coil wire 45*b* is bent on the receiving groove 51*b*, it may extend to the second pass-through portion 56*b*. Thus, there is a level difference between the receiving groove 51*a* and the receiving groove 51*b*, in order to keep the coil wire 45*b* from making contact with other coil wire 45*a*, even if the coil wire 45*b* reaches the second pass-through portion 56*b*.

The first pass-through portion 56*a* guides the coil wire 45*c* extending from the coil 43*c* located under the first pass-through portion 56*a* upward. The coil wire 45*c* extends upward from the coil 43*c*, and is inserted into the first pass-through portion 56*a*. The coil wire 45*c* is bent toward the dividing wall 58 along the upward sloping surface 58*c* of the dividing wall 58 within the first pass-through portion 56*a*, and is then bent upward on the dividing wall 58. The coil wire 45*c* is held while extended above the dividing wall 58. The coil wire 45*c* is pulled out to the second support member 60 without passing through the receiving grooves 51*a* and 51*b* of the first support member 50. By installing the coil wire 45*c*, the number of receiving grooves 51*a* to 51*d* in the first support member 50 can be reduced, thereby improving the workability of pulling out the coil wires 45.

The receiving grooves 51*c* and 51*d* and the second pass-through portion 56*b*, like the above-explained receiving grooves 51*a* and 51*b* and first pass-through portion 56*a*, guide the coil wires 45 coming out of the coils 43 upward from the pass-through portion 56 or receiving groove 51*d*. As such, as shown in FIG. 7, the first support member 50 holds the six coil wires 45 extended above the pass-through portion 56. The coil wires 45 extended upward from the first support member 50 are inserted into through-holes 61 in the second support member 60 to be described later.

As shown in FIG. 6, the first support member 50 has a plurality of leg portions 50*b* and 58*b* protruding downward (toward the stator body 40A) from the underside. The first support member 50 makes contact with the stator body 40A on the lower end faces of the leg portions 50*b* and 58*b*. With this configuration, space is maintained between the first support member 50 and the stator body 40A, and the coil wires 45 coming out of the coils 43 can be pulled out.

As shown in FIG. 3, the first support member 50 has bus bar receiving portions 53*a* and 53*d* for inserting opposite ends of the neutral bus bar 91 and two bus bar holding portions 53b and 53c for holding the neutral bus bar 91. The first support member has bus bar receiving portions 54a and 54d for inserting opposite ends of the neutral bus bar 92 and two bus bar holding portions 54b and 54c for holding the neutral bus bar 92. The neutral bus bar 91 and the neutral bus bar 92 are arc-shaped conductive members made of metallic strips that are bent at about 30° at two places. The neutral bus bar 91 and the neutral bus bar 92 are arranged along the circular ring-shaped first support member 50.

The bus bar receiving portions 53a and 53d and bus bar holding portions 53b and 53c of the first support member 50 have slits for inserting the neutral bus bar 91. The neutral bus bar 91 is inserted into the slits in the bus bar receiving portions 53a and 53d and bus bar holding portions 53b and 53c such that the plate surface faces the central axis J. The bus bar holding portions 53b and 53c hold the two bent portions of the neutral bus bar 91.

The neutral bus bar 91 is connected to the coil wires 45A, 45B, and 45C, in the linear portions which extend through the slits of the bus bar receiving portions 53a and 53d and bus bar holding portions 53b and 53c. The coil wire 45A coming out of the coil 43, located midway between the bus bar receiving portion 53a and the bus bar holding portion 53b, is supported on the first support member 50 while extended upward, and is connected by welding or the like to the linear portion 91A of the neutral bus bar 91.

Likewise, the coil wire 45B, located midway between the bus bar holding portion 53b and the bus bar holding portion 53c, is connected to the linear portion 91B of the neutral bus bar 91. The coil wire 45C, located midway between the bus bar holding portion 53c and the bus bar receiving portion 53d, is connected to the linear portion 91C of the neutral bus bar 91.

The bus bar receiving portions 54a and 54d and the bus bar holding portions 54b and 54c have the same configuration as the bus bar receiving portions 53a and 53d and the bus bar holding portions 53b and 53c. The neutral bus bar 92 is inserted into the slits in the bus bar receiving portions 54a and 54d and bus bar holding portions 54b and 54c, and connected to the coil wires 45D, 45E, and 45F in between the slits of the bus bar receiving portions 54a and 54d and bus bar holding portions 54b and 54c In the stator 40 of this example embodiment, a neutral connection can be made in the stator 40 since the neutral bus bars 91 and 92 are held on the first support member 50, thereby pulling out the coil wires 45 with good efficiency. Moreover, the neutral bus bars 91 and 92 may have a simplified structure because they can be made in a simple shape. Also, the bus bars supported on the first support member 50 are not limited to the neutral bus bars, but may be phase bus bars for connecting U, V, and W phases of a three-phase circuit.

The stator 40 of this example embodiment has a configuration in which a pair of three-phase windings consisting of six coils 43 are arranged in circumferential direction. In one of the three-phase windings, a neutral point is connected to the neutral bus bar 91, and the coil wires 45a to 45c shown in FIG. 7 are pulled out as phase wires of three phases. In the other three-phase winding, a neutral point is connected to the neutral bus bar 92, and the coil wires 45d to 45f are pulled out as phase wires. The six coil wires 45a to 45f coming out of these three-phase windings are inserted into the through-holes 61 in the second support member 60.

Figure 8:
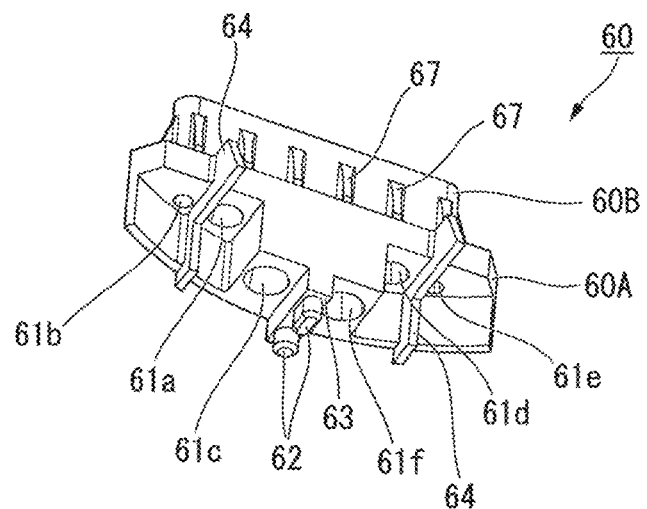
FIG. 8 is a perspective view of a second support member as viewed from below.

FIG. 8 is a perspective view of the second support member as viewed from below. As shown in FIGS. 1 to 4, the second support member 60 is placed over the pass-through portion 56 of the first support member 50. The second support member 60 is a resin-molded member, and has six through-holes 61 that hold the coil wires 45.

Also, in the description below, the plurality of through-holes 61 are simply referred to as "through-holes 61" unless any one or some of them are specified. On the one hand, a particular through-hole is indicated by a code with a subscript (a, etc.) written next to it, as in a "through-hole 61a".

As shown in FIGS. 1 to 8, the second support member 60 has a lower support portion 60A in the lower part and an upper support portion 60B protruding upward from the lower support portion 60A. The six through-holes 61 axially penetrate the lower support portion 60A and the upper support portion 60B. As shown in FIG. 3, the lower support portion 60A has a larger plane area than the upper support portion 60B in an axial view.

The lower support portion 60A is configured to guide the six coil wires 45 extending from the first support member 50 to their corresponding through-holes 61 (61a to 61f). The through-holes 61a to 61f open to the underside of the lower support portion 60A. On the underside of the lower support portion 60A, the two through-holes (first through-holes) 61c and 61f at the center open at a lower position than the other four through holes (second through-holes) 61a, 61b, 61d, and 61e. The through-holes 61a, 61b, 61d, and 61e open at the same height in the axial direction.

The through-holes 61c and 61f are through-holes through which the coil wires 45c and 45f pulled out directly to the pass-through portion 56 from the coils 43 are inserted. Since the undersides of the through-holes 61c and 61f open at a lower position than the undersides of the other through-holes 61, the coil wires 45c and 45f and the other coil wires 45 may avoid contact with each other.

In the lower support portion 60A, the coil wires 45a and 45d (see FIG. 7) pulled out through the receiving grooves 51a and 51c of the first support member 50 are inserted into the through-holes 61a and 61d. The coil wires 45b and 45e pulled out through the receiving grooves 51b and 51d are inserted into the through-holes 61b and 61e. The coil wires 45c and 45f pulled out directly to the pass-through portion 56 from the coils 43 are inserted into the through-holes 61c and 61f.

The through-holes 61a to 61f have a larger diameter on the underside of the lower support portion 60A than on the top side of the upper support portion 60B. With this configuration, the coil wires 45a to 45f can be easily inserted into the through-holes 61a to 61f, thereby improving workability.

In this example embodiment, the bottoms of the two through-holes 61c and 61f at the center have a larger diameter than the bottoms of the other through-holes 61a, 61b, 61d, and 61e. When inserting the coil wires 45a to 45f into the through-holes 61a to 61f, the coil wires 45c and 45f are inserted first into the through-holes 61c and 61f which open at the lowest position. In this case, the larger diameter of the through-holes 61c and 61f makes it easier to adjust the positions of the coil wires 45c and 45f, thereby allowing for easy insertion.

Also, the bottoms of the through-holes 61a, 61b, 61d, and 61e on the outer side, among the six through-holes 61, may have a larger diameter than the bottoms of the through-holes 61c and 61f at the center. The coil wires 45a, 45b, 45d, and 45e inserted into the through-holes 61a, 61b, 61d, and 61e on the outer side are pulled out through the receiving grooves 51a to 51d. For this reason, they are difficult to position with respect to the through-holes 61, as compared to the coil wires 45c and 45f pulled out directly to the pass-through portion 56. As such, the coil wires 45 can be inserted more easily into the through-holes 61 by increasing the diameter of the bottoms of the through-holes 61a, 61b, 61d, and 61e on the outer side.

The lower support portion 60A has a base portion 63 that protrudes downward from in between the two neighboring through-holes 61c and 61f and makes contact with the first support member 50. The base portion 63 has two projections 62 protruding downward from the underside. The projections 62 are inserted into the connecting recesses 58a formed in the dividing wall 58 of the first support member 50. The base portion 63 is placed onto the dividing wall 58 after positioned by the projections 62 and the connecting recesses 58a.

The lower support portion 60A has two plate-shaped dividing walls 64 that extend downward from the underside. One of the dividing walls 64 is located between the through-holes 61a and 61b. The other dividing wall 64 is located between the through-holes 61d and 61e. As shown in FIG. 3, the dividing walls 64 protrude and extend radially inward from the lower support portion 60A. By providing the dividing walls 64, it is possible to avoid contact between the coil wires 45a and 45b inserted into the through-holes 61a and 61b and contact between the coil wires 45d and 45e inserted into the through-holes 61d and 61e.

As shown in FIG. 4, the second support member 60, when placed on the first support member 50, overlaps at least part of the four receiving grooves 51a to 51d in an axial view. More specifically, the second support member 60 covers the two receiving grooves 51b and 51d on the top. The second support member 60 covers the edges of the receiving grooves 51a and 51c on the top, on the pass-through portion 56. The two dividing walls 64 are placed in such a position as to obliquely cross the receiving grooves 51a and 51c, respectively. The second support member 60 covers the pass-through portion 56 of the first support member 50 on the top.

The upper support portion 60B extends in a pillar shape axially upward from the top side of the lower support portion 60A. As shown in FIG. 3, in the upper support portion 60B, the six through-holes 61 are arranged at equal intervals in one direction in an axial view. That is, the upper support portion 60B holds the six coil wires 45 protruding from the motor 1 which are arranged at equal intervals in one direction. As the coil wires 45 are held while kept aligned, the coil wires 45 and the control board 80 can be easily connected together with high accuracy. Moreover, the connection between the coil wires 45 and the control board 80 can be easily automated.

The second support member 60 has a plurality of ribs 67 on the outer periphery of the upper support portion 60B. The ribs 67 are slim and long ridges that extend axially. In the motor 1 of this example embodiment, the ribs 67 fix the upper support portion 60B at given positions. As shown in FIG. 1, the bearing holder 70 has a holder pass-through portion 77 which is formed as a through-hole that axially penetrates it. The upper support portion 60B is inserted into the holder pass-through portion 77 while the bearing holder 70 is attached to the housing 20. The ribs 67 make contact with or are pressed against the inner periphery of the holder pass-through portion 77. With this configuration, the upper support portion 60B is placed with high accuracy at a given position in the holder pass-through portion 77 in an axial view. As such, the coil wires 45 held on the upper support portion 60B are placed with high accuracy at a given position on the bearing holder 70. Consequently, the coil wires 45 are placed with high accuracy with respect to the control board 80 placed on the bearing holder 70, thereby allowing for a high-accuracy and easy connection between the control board 80 and the coil wires 45.

In the stator 40 equipped with the above configuration according to this example embodiment, the coil wires 45 can be pulled out in the first support member 50, without the second support member 60 being attached to it, because the first support member 50 and the second support member 60 are configured as separate members. As such, the workability of pulling out the coil wires 45 can be improved. As the second support member 60 is attached to the first support member 50 holding the coil wires 45 at a given position, the second support member 60 axially covers part of the receiving grooves 51a to 51d, and this keeps the coil wires 45 received in the receiving grooves 51a to 51d from floating upward, thereby ensuring insulation. The first support member 50 and the second support member 60 require no insert molding of metallic parts and can be produced simply by resin molding, and therefore the coil wires 45 can be insulated in a simple structure. In the motor 1 according to this example embodiment, insulation is achieved by the simple structure of the stator 40.

While the first support member 50 in this example embodiment has been illustrated as having a circular ring-shape, the first support member 50 is not limited to the circular ring-shape but may be broken at some points on the circumference. For example, the first support member 50 may be in the shape of an arc that extends along the circumference or in the shape of a angulated bending line.

In the motor 1, the plurality of coils 43 constitute a plurality of connection systems. Specifically, the plurality of coils 43 constitute a first connection system which uses the three coil wires 45a to 45c shown in FIG. 7 as phase terminals and a second connection system which uses the coil wires 45d to 45f as phase terminals. As such, even if a defect occurs to any of these connection systems, electric current may be supplied to the motor 1. The first connection system and the second connection system are constructed by a three-phase circuit to which the coils 43 contained in each of the two connection systems are connected in a star connection. Also, the plurality of connection systems are a plurality of circuits that are electrically connected to different external power supplies and supply electric current for each connection system.

While this example embodiment uses a configuration in which six coil wires 45 are supported by a single second support member 60, the second support member 60 may be divided in two sections so that each section of the second support member 60 supports three coil wires 45. As such, for example, the coil wires 45 of the three-phase windings of the first and second connection systems may be placed at different positions. Also, the motor 1 may be configured to have three or more connection systems.

Figure 9:
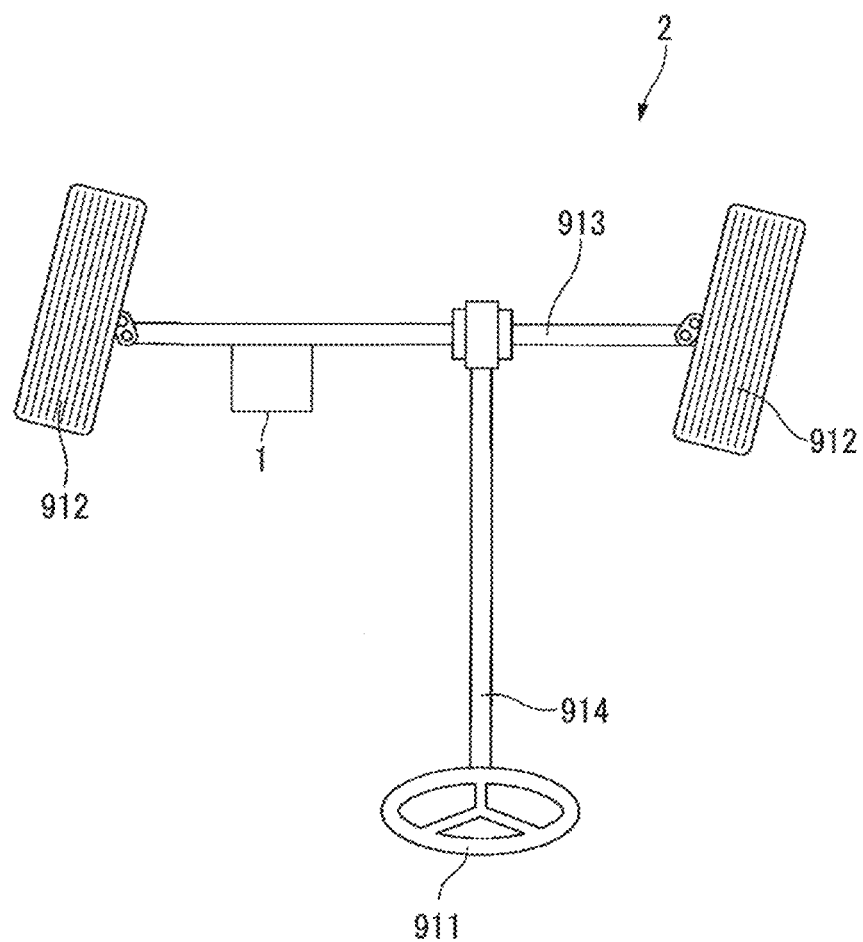
FIG. 9 is a schematic diagram showing an electric power steering according to an example embodiment of the present disclosure.

Next, a device equipped with the motor 1 according to an example embodiment of the present disclosure will be described. In this example embodiment, an example of the motor 1 mounted on an electric power steering device will be described. FIG. 9 is a schematic diagram showing an electric power steering device 2 according to an example embodiment of the present disclosure.

The electric power steering device 2 is mounted on a steering mechanism for wheels of a vehicle. The electric power steering device 2 in this example embodiment is a rack-type power steering device which, powered by the motor 1, reduces steering forces on its own. The electric power steering device 2 comprises the motor 1, a steering shaft 914, and an axle 913.

The steering shaft 914 transfers input from steering 911 to the axle 913 having wheels 912. The power of the motor 1 is transferred to the axle 913 through a ball screw (not shown). The motor 1 used for the rack-type power steering device 2 requires a waterproof structure because it is attached to the axle 913 and exposed externally.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A stator comprising:
   a stator core placed in a circular ring shape around a central axis that extends vertically, onto which coil wires are wound;
   a first support member placed over the stator core; and
   a second support member placed over the first support member,
   the first support member having receiving grooves for guiding the coil wires coming out of the stator core,
   wherein the receiving grooves are grooves that open to the top and extend in a direction along the top surface of the first support member,
   the second support member having through-holes that axially support the coil wires,
   wherein the second support member at least partially overlaps the receiving grooves of the first support member in an axial view,
   wherein the first support member has a plurality of adjacent ones of the grooves and wall portions separating the adjacent ones of the grooves, and
   wherein the receiving grooves are radially adjacent to each other, and bottom sides of each pair of the receiving grooves are located at different axial positions along a radial cross-section.

2. The stator of claim 1, wherein the receiving grooves are linear in an axial view.

3. The stator of claim 1, wherein the receiving grooves are placed radially adjacent to each other, and the longer receiving grooves are placed on the radial inner side in an axial view.

4. The stator of claim 1, wherein the first support member has a downward sloping surface that faces the stator core and is inclined with respect to the central axis, and the coil wires extending from the stator core are guided to the receiving grooves through a part where the coil wires and the downward sloping surface axially overlap.

5. The stator of claim 1, wherein the bottom surface of each receiving groove comprises an upward sloping surface which is inclined with respect to the central axis.

6. The stator of claim 1, wherein the first support member has a pass-through portion that vertically penetrates the first support member, at least part of the second support member overlaps the pass-through portion in an axial view, and the coil wires extend to the second support member via the pass-through portion from the stator core and are supported on the second support member.

7. The stator of claim 6, wherein the pass-through portion is divided into a first pass-through portion and a second pass-through portion by a dividing wall that extends radially, and the coil wires pass through the first pass-through portion and the second pass-through portion.

8. The stator of claim 7, wherein the second support member is connected to the top side of the dividing wall.

9. The stator of claim 6, wherein the second support member has:
   first through-holes that hold the coil wires extending to the second support member through the receiving grooves; and
   second through-holes that hold the coil wires extending to the second support member through the pass-through portion,
   wherein the openings on the undersides of the first through-holes and the openings on the undersides of the second through-holes are at different axial positions.

10. The stator of claim 1, wherein the second support member has a plurality of through-holes, and the second support member has a dividing wall that extends radially, between the openings on the undersides of each pair of adjacent through-holes.

11. The stator of claim 1, wherein the second support member has a plurality of through-holes, and the openings on the undersides of at least two of the through-holes have a different size.

12. The stator of claim 1, wherein the second support member has three or more through-holes, and the openings on the top sides of the three or more through-holes are arranged in one direction in an axial view.

13. The stator of claim 1, wherein a plurality of three-phase windings are formed by winding the coil wires onto the stator core, and the coil wires coming out of the three-phase windings are supported on the through-holes in the second support member.

14. The stator of claim 1, wherein the first support member is circular ring-shaped or arc-shaped, and the first support member supports bus bars.

15. The stator of claim 14, wherein the bus bars are neutral bus bars.

16. A motor comprising:
   the stator as claimed in claim 1;
   a rotor opposed to the stator through a gap;
   a shaft that rotatably supports the rotor around the central axis;
   a bearing that supports the shaft; and
   a bearing holder that holds the bearing,
   wherein the bearing holder has a holder pass-through portion that axially penetrates the bearing holder, and the second support member is inserted into the holder pass-through portion.

17. The motor of claim 16, wherein the second support member has ribs on the outer periphery that make contact with the wall surface of the holder pass-through portion.

18. The motor of claim 16, wherein a board is placed on the top side of the bearing holder and connected to the coil wires extending from the second support member.

19. An electric power steering device equipped with the motor of claim 16, a steering shaft, and an axle.

20. A stator comprising:
   a stator core placed in a circular ring shape around a central axis that extends vertically, onto which coil wires are wound;
   a first support member placed over the stator core; and
   a second support member placed over the first support member,
   the first support member having receiving grooves for guiding the coil wires coming out of the stator core,
   wherein the receiving grooves are grooves that open to the top and extend in a direction along the top surface of the first support member, the second support member having through-holes that axially support the coil wires, wherein the second support member at least partially overlaps the receiving grooves of the first support member in an axial view, wherein the first support member has a pass-through portion that vertically penetrates the first support member, at least part of the second support member overlaps the pass-through portion in an axial view, and the coil wires extend to the second support member via the pass-through portion from the stator core and are supported on the second support member, wherein the second support member has:

first through-holes that hold the coil wires extending to the second support member through the receiving grooves; and second through-holes that hold the coil wires extending to the second support member through the pass-through portion, wherein the openings on the undersides of the first through-holes and the openings on the undersides of the second through-holes are at different axial positions.

21. A stator comprising:

a stator core placed in a circular ring shape around a central axis that extends vertically, onto which coil wires are wound;

a first support member placed over the stator core; and a second support member placed over the first support member, the first support member having receiving grooves for guiding the coil wires coming out of the stator core, wherein the receiving grooves are grooves that open to the top and extend in a direction along the top surface of the first support member, the second support member having through-holes that axially support the coil wires, wherein the second support member at least partially overlaps the receiving grooves of the first support member in an axial view, wherein the bottom surface of each receiving groove comprises an upward sloping surface which is inclined with respect to the central axis.

22. The stator of claim 21, wherein the receiving grooves are linear in an axial view.

23. The stator of claim 21, wherein the first support member has a plurality of adjacent ones of the receiving grooves and wall portions separating the receiving grooves.

24. The stator of claim 23, wherein the receiving grooves are placed radially adjacent to each other, and the longer receiving grooves are placed on the radial inner side in an axial view.

25. The stator of claim 21, wherein the first support member has a downward sloping surface that faces the stator core and is inclined with respect to the central axis, and the coil wires extending from the stator core are guided to the receiving grooves through a part where the coil wires and the downward sloping surface axially overlap.

26. The stator of claim 21, wherein the bottom surface of each receiving groove comprises an upward sloping surface which is inclined with respect to the central axis.

27. The stator of claim 21, wherein the first support member has a pass-through portion that vertically penetrates the first support member, at least part of the second support member overlaps the pass-through portion in an axial view, and the coil wires extend to the second support member via the pass-through portion from the stator core and are supported on the second support member.

28. The stator of claim 27, wherein the pass-through portion is divided into a first pass-through portion and a second pass-through portion by a dividing wall that extends radially, and the coil wires pass through the first pass-through portion and the second pass-through portion.

29. The stator of claim 28, wherein the second support member is connected to the top side of the dividing wall.

30. The stator of claim 27, wherein the second support member has:

first through-holes that hold the coil wires extending to the second support member through the receiving grooves; and second through-holes that hold the coil wires extending to the second support member through the pass-through portion, wherein the openings on the undersides of the first through-holes and the openings on the undersides of the second through-holes are at different axial positions.

31. The stator of claim 21, wherein the second support member has a plurality of through-holes, and the second support member has a dividing wall that extends radially, between the openings on the undersides of each pair of adjacent through-holes.

32. The stator of claim 21, wherein the second support member has a plurality of through-holes, and the openings on the undersides of at least two of the through-holes have a different size.

33. The stator of claim 21, wherein the second support member has three or more through-holes, and the openings on the top sides of the three or more through-holes are arranged in one direction in an axial view.

34. The stator of claim 21, wherein a plurality of three-phase windings are formed by winding the coil wires onto the stator core, and the coil wires coming out of the three-phase windings are supported on the through-holes in the second support member.

35. The stator of claim 21, wherein the first support member is circular ring-shaped or arc-shaped, and the first support member supports bus bars.

36. The stator of claim 35, wherein the bus bars are neutral bus bars.

37. A motor comprising:

the stator as claimed in claim 21;

a rotor opposed to the stator through a gap;

a shaft that rotatably supports the rotor around the central axis;

a bearing that supports the shaft; and a bearing holder that holds the bearing, wherein the bearing holder has a holder pass-through portion that axially penetrates the bearing holder, and the second support member is inserted into the holder pass-through portion.

38. The motor of claim 37, wherein the second support member has ribs on the outer periphery that make contact with the wall surface of the holder pass-through portion.

39. The motor of claim 37, wherein a board is placed on the top side of the bearing holder and connected to the coil wires extending from the second support member.

40. An electric power steering device equipped with the motor of claim 37, a steering shaft, and an axle.

* * * * *